US009826551B2

United States Patent
Agardh (10) Patent No.: US 9,826,551 B2
(45) Date of Patent: Nov. 21, 2017

(54) METHOD AND APPARATUS FOR BANDWIDTH DEPENDENT ACCESS COORDINATION TO A SHARED TRANSMISSION MEDIUM

(71) Applicant: Sony Corporation, Tokyo (JP)

(72) Inventor: Kåre Agardh, Rydebäck (SE)

(73) Assignee: Sony Mobile Communications Inc., Tokyo (JP)

( * ) Notice: Subject to any disclaimer, the term of this patent is extended or adjusted under 35 U.S.C. 154(b) by 76 days.

(21) Appl. No.: 14/851,963

(22) Filed: Sep. 11, 2015

(65) Prior Publication Data

US 2017/0019925 A1 Jan. 19, 2017

Related U.S. Application Data

(63) Continuation of application No. PCT/EP2015/066041, filed on Jul. 14, 2015.

(51) Int. Cl.
*H04W 4/00* (2009.01)
*H04W 74/08* (2009.01)
*H04W 72/12* (2009.01)
*H04W 74/00* (2009.01)
*H04W 84/12* (2009.01)

(52) U.S. Cl.
CPC ..... *H04W 74/0816* (2013.01); *H04W 72/121* (2013.01); *H04W 74/006* (2013.01); *H04W 84/12* (2013.01)

(58) Field of Classification Search
CPC ........... H04W 74/0816; H04W 74/006; H04W 84/12; H04W 72/121
USPC ........................................................ 370/330
See application file for complete search history.

(56) References Cited

U.S. PATENT DOCUMENTS

| | | | |
|---|---|---|---|
| 6,934,752 B1* | 8/2005 | Gubbi | H04L 69/324 370/392 |
| 2015/0289242 A1* | 10/2015 | Cheong | H04W 72/044 370/338 |
| 2015/0359008 A1* | 12/2015 | Wang | H04W 74/004 370/330 |

FOREIGN PATENT DOCUMENTS

| | | |
|---|---|---|
| KR | 20140052893 A | 5/2014 |
| WO | 2014110397 A1 | 7/2014 |

OTHER PUBLICATIONS

Oteri, Oghenekome et al. "Advanced Power Control Techniques for Interference Mitigation in Dense 802.11 Networks", 2013 16th International Symposium on Wireless Personal Multimedia Communications (WPMC), NICT, Jun. 24, 2013, pp. 1-7, XP032493927 [retrieved on Oct. 2, 2013].

Pantelidou, Anna et al. "Grouping Methodology ;11-12-0650-00-OOah-grouping-methodology", IEEE SA Mentor; 11-12-0650-00-00AH-Grouping-Methodology, IEEE-SA Mentor, Piscataway, NJ USA, vol. 802.11ah, May 15, 2012 , pp. 1-14, XP068039139 [retrieved on May 15, 2012].

(Continued)

*Primary Examiner* — Sai-Ming Chan
(74) *Attorney, Agent, or Firm* — James C. Edwards; Moore & Van Allen PLLC (57) ABSTRACT

A method and apparatus for coordinating access to a shared transmission medium in a Wireless Local Area Network (WLAN). The method includes initiating transmission of data from a first device to a second device in a first basic service set (BSS); and providing access opportunity to the first device on the shared transmission medium in one or more time slots, which time slots are assigned dependent on bandwidth of the data to be transmitted.

13 Claims, 3 Drawing Sheets

(56) References Cited

OTHER PUBLICATIONS

Ghosh, Chittabrata et al. "Group Synchronized DCF" IEEE SA Mentor; 11-12-0329-01-OOAH-Group-Synchronized-DCF, IEEE-SA Mentor, Piscataway, NJ USA, vol. 802.11ah, No. 1, Mar. 13, 2012, pp. 1-13, XP068038643 [retrieved on Mar. 13, 2012].

Khorov, Evgeny et al. "A survey on IEEE 802.11ah: An enabling networking technology for smart cities", Computer Communications, vol. 58, Mar. 1, 2015, pp. 53-69, XP029200607, ISSN: 0140-3664, DOI: 10.1016/J.COMCOM.2014.08.008.

International Search Report and Written Opinion; Mar. 21, 2016; issued in International Patent Application No. PCT/EP2015/066041.

* cited by examiner

METHOD AND APPARATUS FOR BANDWIDTH DEPENDENT ACCESS COORDINATION TO A SHARED TRANSMISSION MEDIUM

TECHNICAL FIELD

This application relates to methods and systems for coordinating access to a shared transmission medium, in particular to solutions for handling access of different stations to a Wireless Local Area Network (WLAN), dependent on bandwidth of the data to be transmitted. Specific solutions target the problem of coordinating access in situations where different WLANs overlap.

BACKGROUND

The deployment of wireless networks, such as solutions based on IEEE 802.11, has increased rapidly, and continues to do so. In addition, the data transmission bandwidth continues to increase with new releases of WLAN technology. As a result, an ever increasing multitude of stations, most notably mobile stations, being capable of communicating through WLAN, are taken into use. This results in dense environments, where large numbers of stations may compete to gain access to the Internet or other services, through the use of WLAN.

In WLAN radio traffic is provided on a shared transmission medium. One state of the art solution used for coordinating Media Access Control (MAC) is denoted Carrier Sense Multiple Access (CSMA), which may be carried out in a variety of modes. This method involves the use in a transmitter of feedback from a receiver, to determine whether another transmission is in progress before initiating a transmission. The CSMA method may be further combined with other techniques for providing suitable coordination of data traffic. One example of such a technique is CSMA with Collision Avoidance (CSMA/CA), by means of which transmission is deferred for an interval if the channel is sensed busy before transmission, which reduces the probability of collisions on the channel. Other CSMA techniques include CSMA with Collision Detection (CSMA/CD).

With the high increase of stations competing to gain access to a WLAN Access Point (AP), there is however still need for improvement in the art of coordinating access to a shared transmission medium. One problem related to the high-density deployments of such networks is the risk of overlap of Basic Service Sets (BSSs), where plural APs are provided with at least partly overlapping communication range. Simultaneous transmission from such APs and stations in such a scenario may cause collisions, which can result in excessive management traffic and reduction of throughput.

In managed WLAN networks such as offices, public venues etc., the WLAN configuration is often such that it only allows narrow bandwidth traffic, say 20-40 MHz, to facilitate cell and channel planning. On the other hand, private networks optimized for peak throughput rather than capacity may allow up to 160 MHz channels. Similarly for the device side, some devices support wide bandwidth and some don't. Therefore, real networks include a mix of devices and access points configured for transmission at different bandwidths. This scenario may create problems, since the transmission at e.g. one 160 MHz channel will momentarily occupy a transmission channel spectrum that could otherwise have been allocated to 8 separate devices, transmitting at 20 MHz. This disclosure proposes a method to allow better coexistence and utilization of the spectrum in environments with devices having different bandwidth configurations.

SUMMARY

Solutions to this problem are provided herein, by means of a method and an apparatus or system for carrying out such a method. The method may be a computer-implemented method, carried out by executing computer program code, stored in a memory, by means of a processor in an apparatus connected to a WLAN AP.

According to a first aspect, a method is provided for coordinating access to a shared transmission medium in a Wireless Local Area Network (WLAN), comprising the steps of:

initiating transmission of data from a first device to a second device in a first basic service set (BSS);

providing access opportunity to the first device on the shared transmission medium in one or more time slots, which time slots are assigned dependent on bandwidth of the data to be transmitted.

In one embodiment, the step of providing access opportunity in time slots assigned dependent on bandwidth is carried out responsive to determining that the first device is in an edge region of the first BSS with respect to a first access point (AP).

In one embodiment, the method comprises the step of coordinating access opportunity provided to the first device with other devices associated with a second overlapping BSS.

In one embodiment, the method comprises the steps of designating a group association dependent on bandwidth, wherein a first group is associated with transmission at a first bandwidth, and a second group is associated with transmission at a second bandwidth, which is higher than the first bandwidth;

assigning time slots for transmission of data dependent on the group association.

In one embodiment, the method comprises the step of providing access opportunity for transmission of data of the second group within a first set of time slots, but not within a second set of time slots, not including time slots of the first set of time slots.

In one embodiment, the method comprises the step of providing access opportunity for transmission of data of the first group within the second set of time slots.

In one embodiment, the method comprises the step of providing access opportunity for transmission of data of the first group within the first set of time slots.

In one embodiment, the method comprises the steps of allocating the first device to one of said groups dependent on a selection rule;

informing the first device of the allocated group, in which access opportunity will be provided.

In one embodiment, said selection rule involves allocating the first device to a group that corresponds to a bandwidth capability associated with the first device.

In one embodiment, the method comprises the step of conveying information of the designated groups to the first device, so as to allow the device to allocate to one of said groups dependent on a selection rule.

In one embodiment, the method comprises the step of allocating the first device to one of said groups, for transmission opportunity of at least a first frame, dependent on the indicated bandwidth of said at least first frame.

In one embodiment, the method comprises the step of allocating the first device to another one of said groups, for transmission opportunity of a later frame, dependent on the bandwidth of that said frame, if a different bandwidth is indicated for said later frame than for said first frame, corresponding to a different group association.

According to a second aspect, an apparatus is provided for coordinating access to a shared transmission medium in a Wireless Local Area Network (WLAN), in which network a first device is configured to transmit data to a second device associated with a first basic service set (BSS), comprising a processor configured to execute program code, and a memory comprising instructions that when executed by the processor cause the apparatus to provide access opportunity to the first device on the shared transmission medium in one or more time slots, which time slots are assigned dependent on a bandwidth of the data to be transmitted.

In one embodiment, the memory includes instructions that when executed cause the apparatus to designate a group association dependent on bandwidth, wherein a first group is associated with transmission at a first bandwidth, and a second group is associated with transmission at a second bandwidth, which is higher than the first bandwidth; and to assign time slots for transmission opportunity of data dependent on the group association.

In one embodiment, the memory includes instructions that when executed cause the apparatus to carry out any of the preceding method steps.

According to a third aspect, a device is provided, configured to transmit data to a recipient device associated with a first basic service set (BSS) of a Wireless Local Area Network (WLAN), which WLAN comprises an apparatus for coordinating access on to the first device on a shared transmission medium, wherein the device is configured to transmit data in accordance with a group allocation dependent on bandwidth of the data to be transmitted, and wherein the device is configured to attempt to access the shared transmission medium within time slots assigned dependent the group allocation.

BRIEF DESCRIPTION OF THE DRAWINGS

Various embodiments of the invention will be described below with reference to the accompanying drawings, in which FIG. 1 schematically illustrates an example of WLAN devices set up for communication according to an embodiment.

DETAILED DESCRIPTION

A detailed description of various embodiments will now be described with reference to the drawings. This description provides detailed examples of certain possible implementations, but it should be noted that the details are intended to be exemplary and in no way limit the scope of the application. In addition, embodiments other than those described in detail may be put to practice.

Figure 1:
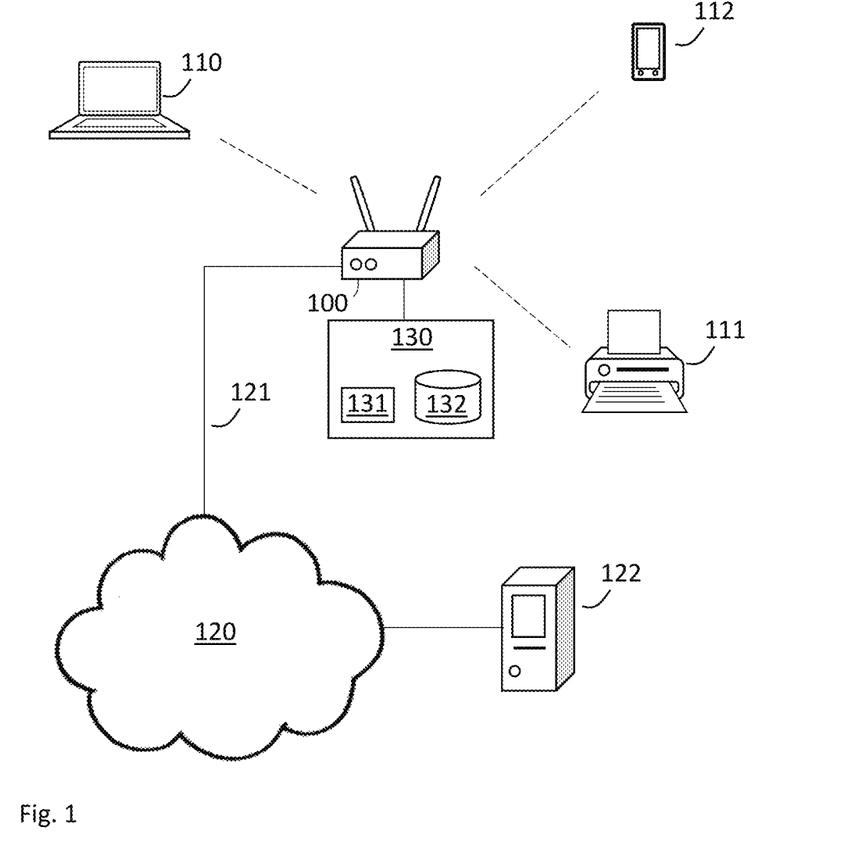

In FIG. 1 a number of WLAN devices are shown. The WLAN may include an access point (AP) 100, configured to interconnect wireless stations with wired network nodes. In the drawing, the WLAN devices include a station (STA) 110 in the form of a portable computer, a STA 111 in the form of a printer, and STA 112 in the form of a mobile phone. These are merely examples provided to indicate the principle, and that WLAN devices may include both substantially mobile or portable devices 110, 112, and substantially stationary devices 111. The WLAN may be configured to implement one or more protocols of the IEEE 802.11 communication standard. It may be noted, though, that the solutions provided herein may be applied to other network systems, in which devices are allowed to compete for access.

An AP and the STA(s) associated with the AP comprise a basic service set (BSS). In the example of FIG. 1, AP 100 and STAs 110, 111 and 112, may be comprised in a first BSS. An extended service set (ESS) may comprise one or more APs (with one or more BSSs) and STA(s) associated with the APs. An AP is typically connected to a distribution system 121, which may be wired and/or wireless, for carrying traffic between the AP and a destination outside the WLAN, such as a node 122, e.g. a server, connected via a network 120. Traffic between STAs within the WLAN may be sent through one or more APs. For example, a source STA 110 may have traffic intended for a destination STA 111.

WLAN devices, including STAs APs, may use a Carrier Sense Multiple Access with Collision Avoidance (CSMA/CA) channel access mechanism, wherein a device may sense the primary channel. If e.g. a STA 110 has data to send, the STA 110 may sense the primary channel. If the primary channel is detected to be busy, the STA 110 may back off. Channel access may include request to send (RTS) and/or clear to send (CTS) signaling. For example, an exchange of an RTS frame may be transmitted by a sending device and a CTS frame that may be sent by a receiving device. The CTS frame may include a time value that may alert other STAs to hold off from accessing the medium while the device initiating the RTS may transmit its data.

Any device in a WLAN, such as an AP or a STA, may include a processor, a memory, a radio receiver and/or transmitter, one or more antennas, etc. A processor function may comprise one or more processors. For example, the processor may comprise one or more of: a general purpose processor, a special purpose processor (e.g., a baseband processor, a MAC processor, etc.), a digital signal processor (DSP), Application Specific Integrated Circuits (ASICs), Field Programmable Gate Array (FPGAs) circuits, any other type of integrated circuit (IC), a state machine, and the like.

The one or more processors may be integrated or not integrated with each other. Such processors may be integrated with one or more other functions, such as memory, and may perform signal coding, data processing, power control, input/output processing, modulation, demodulation, and/or any other functionality that may enable the device to operate in a wireless environment, such as the WLAN of FIG. 1. The processor may be configured to execute processor executable code, such as software and/or firmware instructions. For example, the processor may be configured to execute computer readable instructions included on one or more of the processor or memory. Execution of the instructions may cause the device to perform one or more of the functions described herein.

Transmit Power Control (TPC) in a wireless network may be used for minimizing interference between nodes, improving wireless link quality, reducing energy consumption, controlling the network topology, reducing interference with satellites/radar or other technologies, or improving coverage in the network. TPC in wireless networks may be open loop or closed loop. In open loop TPC, the transmitter may control transmit power independent of the receiver. In closed loop TPC, the receiver may direct the transmitter to increase or decrease the transmit power of the transmitter based on one or more metrics. TPC may be implemented in a number of ways in different wireless networks. TPC in WLANs may be MAC based and may involve the transmission and reception of TPC MAC packets. The TPC may support the adaptation of the transmit power based on one or more information elements (IEs) including, for example, path loss, link margin estimates etc. This TPC is open loop and the transmitting node (e.g., an AP or a STA) may determine transmit power independent of the receiving node.

In cellular networks, inter-cell coordination schemes may be used to manage interference by coordinating transmission and reception between cells, based upon deliberate multiple-access scheduling over time and frequency in a fraction of the transmission bandwidth. As opposed to the cellular scenario, the scheme described herein may leverage the random access nature of CSMA/CA across the entire transmission bandwidth. Interference coordination in WLAN networks may be proprietary and may be carried out in wireless network controller at layers higher than the PHY and MAC. Some of the wireless LAN networks may use techniques that may be coordinated to reduce the effect of a large number of APs and/or STAs. For example, in IEEE 802.11ah based networks, different types of overlapping BSS (OBSS) networks may interfere with each other. Such OBSS issues may be addressed by minimizing interference between the overlapping networks and sharing the channel in time domain. Time division mechanisms may be utilized with physical grouping or logical grouping of STAs with an emphasis on transmission in dedicated sectors.

WLAN networks may be deployed in dense environments with multiple APs and BSSs. The high density deployment may result in an overlap of adjacent BSSs. One of the key problems in dense environments is the disturbances coming from overlapping networks (OBSS) operating on the same channel. When multiple OBSSs use the same frequency bands, interference may be a problem, e.g., for the STAs on the edge of coverage. The increased interference may result in a reduction in the network throughput as seen at the MAC layer, the MAC goodput, and an increase in energy expenditure. The effect of the interference on the MAC goodput and energy efficiency of the network may be mitigated. Known and studied methods to minimize OBSS impact include alternation of devices output power in order to lower overall noise and "unnecessary" range. Also, different scheduling mechanisms are evaluated that could minimize collisions and hence increase aggregated throughput. When available, the adjacent APs may choose different frequency bands of operation. In some networks, the use of different frequency may not be possible. Independent operation of CSMA/CA in each OBSS may result in simultaneous transmissions from multiple APs resulting in collisions and causing excessive management traffic or prevention of transmissions due to collision avoidance, resulting in the reduction of throughput.

Figure 2:
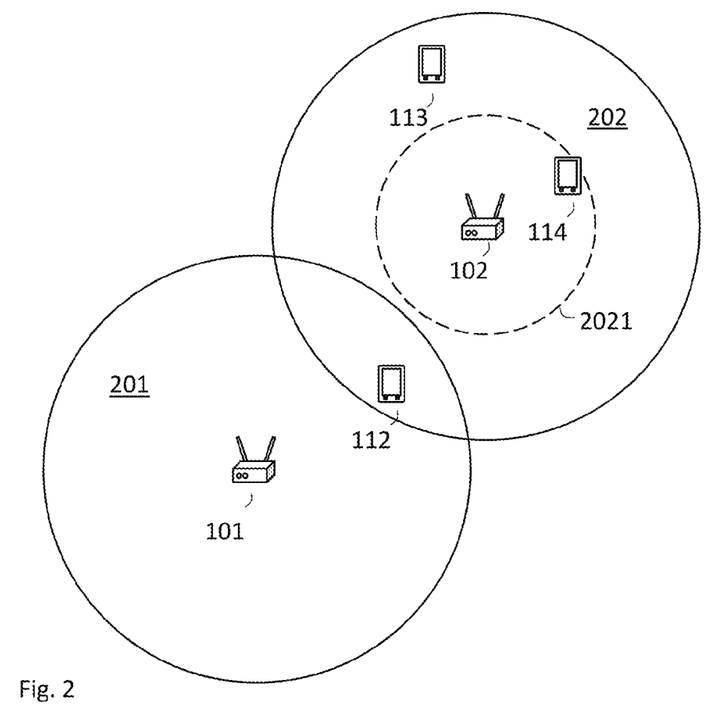
FIG. 2 illustrates an example of transmission in overlapping basic service sets.

FIG. 2 illustrates an example of transmission in OBSSs and the related problem. In the drawing, a first AP 101 forms a first BSS 201 together with at least a first STA 112. A second AP 102 forms a second BSS together with at least a second STA 113. The two BSSs 201, 202 overlap at least partly. More specifically, in the scenario of FIG. 2, the first station 112 may be within reception range of the second AP 102. APs 102 and 202 may transmit data, independently and simultaneously, to any of the STAs in their BSSs, e.g. STAs 112 and 113, respectively. As a consequence, transmission from AP 101 to STA 112 in BSS 201 may fail due to the transmission from AP 102 to STA 113 in BSS 202.

Such transmission failure issue may be addressed for network throughput improvement and energy efficiency. One attempt at targeting this problem was provided in Advanced Power Control Techniques for Interference Mitigation in Dense 802.11 Networks, by Oteri et al., of InterDigital Inc. The solutions discussed therein were also outlined in WO2014/179713A1 by the same inventors. There proposition is to implement a fractional CSMA/CA technique, by user grouping, enhanced transmit power control, and inter-BSS coordination used to improve the system performance of a dense, overlapped network with multiple BSSs. Using TPC, inter-BSS coordination, and user grouping two APs in an OBSS may transmit simultaneously with little or no collisions. In a fractional CSMA/CA method, a fraction of the total STAs may be permitted to access the channel at a particular time. To limit the amount of interference, the access duration may be coordinated between multiple BSSs. Using TPC, the interference resulting from the coordinated transmissions may be limited. Using the coordinated transmission as described herein, the area covered by the transmissions (e.g., the coverage area) of a subset of the BSSs in the network may be implicitly reduced, thereby reducing the amount of overlap between BSSs and improving the system performance.

In the solution proposed by Oteri et al, which may or may not form a basis for the solutions provided herein, the STAs in each BSS are grouped into one or more groups based on the amount of interference the STAs may receive from other BSSs or offer to other BSSs in the network, whereby STAs are partitioned into BSS-edge STAs and BSS-center STAs. A BSS-edge STA may be adversely affected by a neighboring BSS during reception or may adversely affect a neighboring BSS during transmission. A BSS-center STA may be a non-BSS-edge STA. In FIG. 2, such a BSS-center STA 114 is shown for BSS 202. In case of transmission between an AP 101 and a BSS-edge STA 112 in a first BSS 201, the neighboring BSS 202 may limit its transmission to BSS-center STAs, such as STA 114, and not transmit to BSS-edge STAs 113. The neighboring BSS 202 may also control its power by TPC or even enhanced TPC, so as not to reach edge parts of the BSS 202. This may limit its interference effect on the STA 112 in the first BSS 201. Timing and coordination may be provided, such that one or more BSS center STAs may be placed in an active CSMA/CA pool. To limit the amount of interference between adjacent or overlapping BSSs, the timing of the edge BSSs (e.g., placed in the active CSMA/CA pool) may be coordinated between overlapping BSSs. The coordination may be centralized or distributed. The timing of the edge BSSs may be controlled such that the adjacent groups are orthogonal or partially orthogonal.

If the APs in a network are F-CSMA/CA capable, each AP may identify the BSS-edge STAs and non BSS-edge STAs under its control. BSS-edge STAs may be identified using a one or more of techniques including, for example, path loss, physical/geographic location, STA assisted, genie aided etc. The networks with F-CSMA/CA capabilities may be checked using an F-CSMA/CA capabilities signaling field. If neighboring APs do not support the feature or are instructed not to use the feature, the packet transmission may follow using legacy operation, e.g. 802.11ac, 802.11ah, etc.

In each BSS, the STAs may be grouped based on a desired criteria e.g. BSS edge, BSS center, etc. For example, Group 1 may include BSS center STAs in each of the BSSs, group 2 may include BSS edge STAs in odd numbered BSSs, and group 3 may include BSS edge STAs in even numbered BSSs. One or more APs may coordinate to allow access of each to the pool of STAs performing CSMA/CA based on the BSS index. For example, Group 1 may be placed in the active CSMA/CA pool. Groups 2 and 3 may be placed in the active CSMA/CA pool in a coordinated manner during particular time slots. The coordination may be such that groups 2 and 3 are in orthogonal pools e.g., when group 2 is in the pool, group 3 may not be in the pool, or in partially orthogonal pools. The STA grouping may be combined with TPC to limit interference. The transmit power may be adjusted based on the group in the active CSMA/CA pool. The maximum transmit power may determine the power at which the control frames needed by each of the STAs may be sent. If group 1 is in the pool, the maximum transmit power may be limited to the worst STA in the limited group, such as the STA that may require the maximum transmit power in group 1. The maximum transmit power may be used for both data and control frames.

Figure 3:
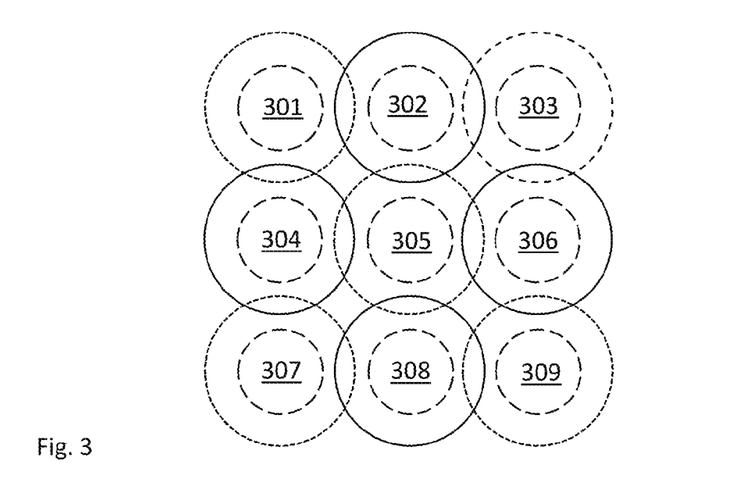
FIG. 3 illustrates an example of a WLAN system with BSS-edge and BSS-center partitioning, to which various embodiments apply.

FIG. 3 illustrates an example of a WLAN with a number of OBSSs 301-309. In each of these, the respective BSS has a BSS-edge and BSS-center partitioning, where STAs present within the dashed circle may be determined to form part of a BSS center group. STAs located within the respective outer circle but outside the dashed circle may be determined to form part of a BSS edge group. As can be seen, some of those BSSs are indicated with dotted line outer circles, in this example the odd numbered BSSs, whereas the others circle of the even numbered BSSs are full drawn. In one example, all STAs deemed to be BSS center may form part of a first group G1. Furthermore, orthogonality may be provided for edge STAs by suitable grouping, which are given access in different time periods.

Figure 4:
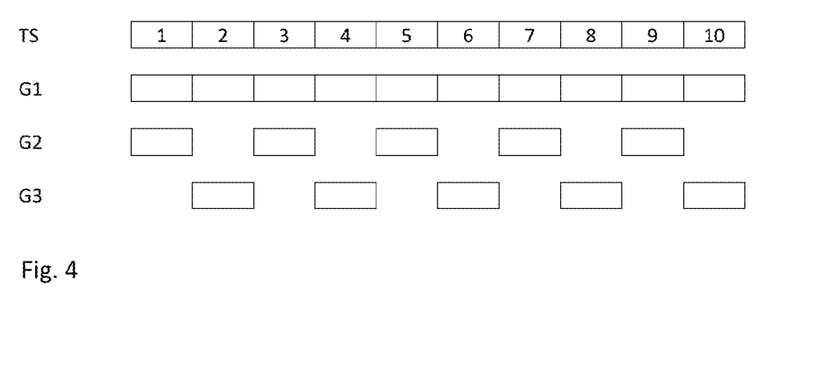
FIG. 4 illustrates an example of separation of access opportunity into groups relevant for a system of FIG. 3, according to which some embodiments apply.

FIG. 4 illustrates the time segmentation of different STA groups schematically, where a series of 10 time periods TS are indicated. The G1 STAs may be placed in an active CSMA/CA pool in each of the time slots. Edge STAs may be placed in two different groups G2 and G3, respectively. In accordance with the drawing of FIG. 2, edge STAs of odd number BSSs are placed in group G2, and edge STAs of even number BSSs are placed in group G3. STAs of G2 and G3 may be placed in the active CSMA/CA set during specific time-slots. The grouping may be combined with TPC to limit interference. To limit the amount of interference between OBSSs, the timing between the different groups may be coordinated between overlapping BSSs. The coordination may be centralized or distributed, and the coordinated timing across adjacent BSSs may be set to be fully orthogonal (e.g., where there is no interference between interfering groups) or partially orthogonal (e.g., where the interfering groups may have some level of overlap, up to a desired orthogonality level). Orthogonality between groups may be achieved, for example, by using beacons and the beacon intervals. Further details of the grouping and embodiments for avoiding collision are outlined in the aforementioned publication WO2014/179713A1, which is incorporated herein by reference.

A challenge with state of the art solutions is the coexistence of devices configured to transmit at different bandwidth. 802.11 is a "listen-before-talk" protocol in which gaps in the transmission medium usage are an important component of the coordination process that divides up access to the medium among many stations. However, as noted by author Matthew S. Gast in "802.11ac: A Survival Guide", O'Reilly Media, Inc., Jul. 23, 2013, an important component of the 802.11ac standard is the way that a BSSID (Basic Service Set ID) can switch channel bandwidth dynamically on a frame-by-frame basis. Rather than enforcing a one-bandwidth-fits-all approach, 802.11ac allows channel bandwidth to be determined on a frame-by-frame basis. By selecting the channel bandwidth to be used on a per-frame basis, 802.11ac can more efficiently use the available spectrum. When a wide channel is available, high data rates are possible. When only a narrow channel is available, 802.11ac can fall back to lower rates. In e.g. the 5.1 GHz spectrum, a multitude of 20 MHz channels can be defined, which may be substantially orthogonally used. However, if 40 MHz bandwidth is to be used for transmission, two 20 MHz channels must be free for access. In addition, the 802.11ac specification gives room for transmission at 80 MHz and 160 MHz too, requiring 4 and 8 free channels, respectively.

Figure 5:
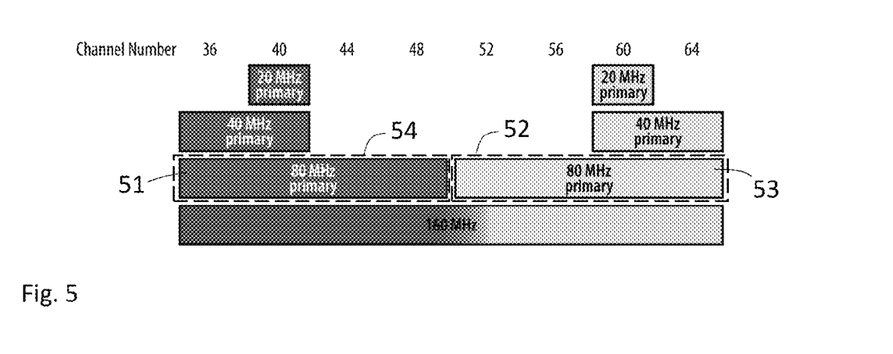
FIG. 5 illustrates spectral channel distribution for coexisting networks.

FIG. 5, which corresponds to FIG. 3-6 in Gast's book, illustrates the coexistence of multiple networks in the same frequency space. A consequence of using a 160 MHz channel, is that it takes up bandwidth room that could have been used by 8 different overlapping networks without risk for interference or disturbance. One way to help multiple networks to share the same frequency space is the notion of primary and secondary channels. Due to the wide variety of devices and data rates in use, a network that is designed for peak speed using 160 MHz channels will not always need the full capacity of the channel. However, a primary 80 MHz channel 51 may be defined, with an associated adjacent secondary 80 MHz channel 52, in a network. In the example of FIG. 5, a first network may have a primary 80 MHz channel 51, occupying the 20 MHz channels 36, 40, 44 and 48. An associated secondary channel 52 may also be defined, indicated by a dashed contour in the drawing, at channels 52, 56, 60 and 64. A second network can coexist without interference in transmission of up to 80 MHz, if its primary 80 MHz channel 53 is defined at 20 MHz channels 52, 56, 60 and 64, as illustrated in FIG. 5. Also the second network may have a secondary 80 MHz channel 54 over 20 MHz channels 36, 40, 44 and 48, as indicated by a dashed contour. However, in order for a network to be able to transmit at 160 MHz, both its primary and secondary 80 MHz channels must be available. Hence, for overlapping networks, there may be simultaneous traffic at the same frequency bands in this situation, which may have negative effect on throughput. It should be noted that the corresponding problem may exist even for the narrower bandwidths, for e.g. 20 or 40 MHz channels, where secondary channels of one network overlap with primary or secondary channels of a second network.

In order for the state of the art proposal for overlapping networks, as defined by Oteri et al, to be efficient, devices that are in edge regions have to be classified smartly for the scheduling to have effect, and the previously proposed solution involves classifying devices in groups based on path loss, expected RSSI, GPS location as well as with manual settings, to identify edge regions where collisions are more likely. However, that solution does not handle the situation of coexistence of network, operating at different, and partly or fully orthogonal primary channels, where transmission at higher bandwidths may nevertheless overlap spectrally, and hence interfere.

A solution proposed herein is therefore a method and apparatus for allowing better coexistence and utilization of the spectrum in network environments with devices, stations and access points, having different bandwidth configurations. The proposed solutions may be employed as an alternative, or as a complement, to grouping of devices in "edge" regions according to the referenced publication by Oteri et al. The proposed solutions for increasing efficiency entail allowing networks to create groups of devices that have similar RF configuration. Each group will be allocated certain time slots where they are recommended to access the channel. Hence, this disclosure proposes grouping into CSMA time slots and allocating devices based on their occupied bandwidth. In this way, overlapping or partly overlapping networks may be given higher continuous free airtime.

On a general level, a proposition is to allocate devices to specific groups, using RF bandwidth as key selection parameter. Such group allocation can be done in accordance with two main approaches:

I. Centralized, where an AP designates each device to a specific group. As an example, the following groups may be designated: a 20-40 MHz group, a 80 MHz group, and a 160 MHz group. A different set of time slots may be assigned to at least two of the groups. A device of the network may then be allocated one of those groups, and thereby be given the opportunity to access the shared channel space under CSMA at the assigned set of time slots.

II. Distributed. The AP, or other network entity connected to the AP, may in such an embodiment create "empty" groups for different bandwidths, e.g. with the same designation as outlined for the centralized approach above. The AP will then inform all devices in the network about the group configurations. Each device then selects a group based on actual traffic, and will thereby only attempt to access the shared channel space in the time slots assigned to the corresponding group. In this approach, a device may e.g. change group at any frame, dependent on the desired bandwidth of its payload.

On a general level, the proposed solution involves a method for coordinating access to a shared transmission medium in a WLAN. This WLAN may be an 802.11 type system, or any other wireless network in which access may be given by competition among devices, according to e.g. CSMA or corresponding procedures. The method includes initiating transmission of data from a first device to a second device in a first basic service set (BSS). While BSS is a term for 802.11 systems, it shall be understood as a setup of communicating devices in the network. The devices may include one Access Point (AP) and one or more stations (STA). Access opportunity may be provided to the first device on the shared transmission medium in one or more time slots, which time slots are assigned dependent on bandwidth of the data to be transmitted. This way, a method is offered in which access is coordinated dependent on radio frequency configuration, namely bandwidth.

In one embodiment, access opportunity is provided to devices of the network in accordance with a group association. Designation of a group is based on bandwidth requirements. Hence, association of a device to a designated group is dependent on at least bandwidth of data transmitted, or to be transmitted, by or to the device in question. A first group may be associated with transmission at a first bandwidth, and a second group may be associated with transmission at a second bandwidth, which is higher than the first bandwidth. Time slots for transmission of data are assigned dependent on the group association.

Different embodiments may involve designation of more than two groups, such as three or four. In one embodiment, the number of groups may also vary dynamically, dependent on the devices included in the network. If there are only devices present, able to transmit at one and the same bandwidth, only one group (or in effect no grouping) may be employed. Once a new device joins the network, which new device is capable of transmitting at higher bandwidths, a different group designation may be made for such higher bandwidth.

In one embodiment, each group may be designated by one channel bandwidth size, such as 20, 40, 80 or 160 MHz. In an alternative embodiment, a group may be formed for a range of channel bandwidths, e.g. 20-40, 20-80, 40-80, 40-160 or 80-160 MHz.

In one embodiment, access is coordinated for devices dependent on group allocation for the devices in the network. In such an embodiment, a device is allocated to one of said groups dependent on a selection rule. This allocation may be performed by the AP, or by another apparatus communicatively connected to the AP, and the device may be informed of the group it is allocated to, in which access opportunity will be provided. In one embodiment, a device may have a certain bandwidth capability, as limited by e.g. chipset hardware. This bandwidth capability may be reported by the device to the AP or other apparatus, or otherwise deducted by the AP or other device from other information, such as 802.11 level capability of the device. The selection rule may then involve allocating a device to a group that corresponds to its bandwidth capability. In an alternative embodiment, the group allocated to the device may be dependent on a priority level set for different types of devices, where higher priority is given to selected devices, and where a device may be allocated to a group of lower priority even if it is capable of transmitting at a higher bandwidth representative of the requirement for the higher priority group. Such a prioritized grouping may e.g. be employed where better service is saved for certain users, such as owners or members of an otherwise open network. As an example, a home network may be configured to provide higher bandwidth access to devices of a "home" group, including the family members, and a lower bandwidth access of devices of a "guest" group. So, home member devices may be allocated to the group dependent on bandwidth capability. A guest device may, on the other hand, be allocated to a group of lower bandwidth even if capable of transmission at the higher bandwidth. Such priority level, and group allocation, may e.g. be assigned dependent on use of different passcodes for accessing the network.

In one embodiment, the allocation of a device, or a frame to be transmitted, to a group is controlled by that device, in accordance with a selection rule. In this embodiment, the designation of the groups, e.g. information that reveals, implicitly or explicitly, which bandwidths associated to which groups, is conveyed to the devices in the network. This can be accomplished by broadcast, since it is not device-dependent, or by direct device signaling. This allocation may be performed by the AP, or by another apparatus communicatively connected to the AP. Each device will then be configured to determine the group to which it is allocated, according to the appropriate selection rule. As noted, the selection rule may be bandwidth capability, and may also be combined with a priority level, as outlined above.

In another embodiment, group allocation may be carried out dependent on actual RF configuration. In such an embodiment, a first frame to be transmitted by a device may be designated to a said group dependent on indicated bandwidth of that frame. Or, worded differently, the device may be allocated to a group corresponding to the bandwidth of a first frame to be transmitted dependent on indicated bandwidth of that frame. Such indication may be found in a header related to the frame, and may relate to the payload of that frame. As noted before, channel bandwidth may be determined on a frame-by-frame basis, and also the group allocation may in this embodiment change dependent on the indicated channel bandwidth. This way, a later frame for transmission by a device may be designated to another one of the groups dependent on the bandwidth of that later frame, if a different bandwidth is indicated for the later frame than for the first frame. The first device will thus be allocated to that other group for transmission opportunity of the later frame, dependent on the bandwidth of that said frame, if a different bandwidth is indicated for said later frame than for said first frame, corresponding to a different group association In one embodiment, a group allocation is made for the device dependent on the current target channel bandwidth of the frame. In another embodiment, group allocation or designation is only made for the data, e.g. data frames, and not for the device as such.

In the embodiments disclosed, devices being provided with access opportunity in the same time slots may be allowed access to the shared transmission medium under carrier sense multiple access (CSMA). A group may e.g. be assigned to a certain number of 10 ms time slots, and this number may vary dependent on how many devices (or frames) that are present in the network at the moment, in relation to members of other groups, so as to obtain a balancing effect.

As noted, access opportunity will be provided on the shared transmission medium in one or more time slots, which time slots are assigned dependent on bandwidth of the data to be transmitted, either as determined from the capability of the sending device, or of the target bandwidth of the data as such. In one embodiment, at least two groups are designated; a first group associated with transmission at a first bandwidth, and a second group may be associated with transmission at a second bandwidth, which is higher than the first bandwidth. Time slots for transmission of data are assigned dependent on the group association, either under direct control by the AP or other apparatus connected thereto, or by the device itself after receiving group designation information with regard to at least bandwidth.

In one embodiment, access opportunity is provided for transmission of data of a the second group within a first set of time slots, but not within a second set of time slots, not including time slots of the first set of time slots. This way, transmission of high bandwidth frames is confined to the first set of time slots, where access will be coordinated under CSMA between all sending devices. On the other hand, access opportunity for transmission of data of the first group, of lower bandwidth, is provided within the second set of time slots where no access is given to the higher bandwidth data. A benefit of this is that there will always be opportunity for lower bandwidth data to be transmitted, at least within the second set of time slots. This minimizes the risk for such lower bandwidth data to be drowned by a multitude of high bandwidth data that is otherwise arbitrarily distributed over time. More particularly, this is beneficial for coexisting networks with at least partial overlap in range. In such coexisting networks the lower bandwidth data, such as e.g. data of 80 MHz groups 51 and 53 of FIG. 5, can freely transmit data without interference from each other, since they are spectrally separate, but without risking to be interfered by any 160 MHz transmission during that second set of time slots. This minimizes the risk for disturbances in the networks, and a possibility for higher throughput. In a preferred embodiment, access opportunity may be provided for transmission of data of the first group also within the first set of time slots. In such a scenario, there will of course still be competition for access under CSMA among such data, but also with higher bandwidth data of the second group.

Figure 6:
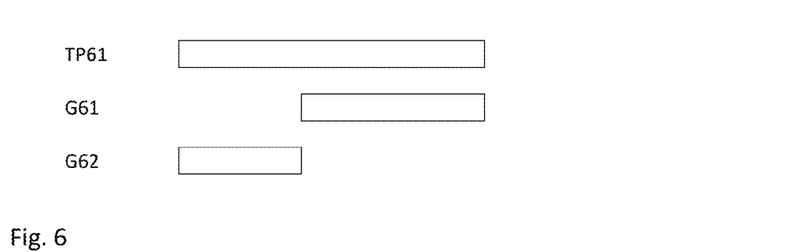
FIG. 6 illustrates time partitioning for different groups according to one embodiment.

FIG. 6 schematically illustrates assigning of time slots dependent on bandwidth according to one embodiment, over a time period TP61. In one embodiment, the time period TP61 may correspond to one or more time periods TS according to FIG. 4, and the slot assignment may be employed for all devices or STAs in e.g. one BSS. In such an embodiment, a subsequent time period could follow immediately upon completion of TP61, with an identical slot assignment, if the device presence and traffic pattern remains the same. In another embodiment, time period TP61 may correspond to a time period TS assigned to STAs of a certain group, e.g. TS 1, 3, 5, . . . for group G2 of FIG. 4. In such an embodiment, the time slot assigning of FIG. 65 may be employed only for devices of group G2, such as a subset of edge STAs, e.g. edge STAs of odd number BSSs. In other words, the boxes G61 and G62 in FIG. 6 would in such an embodiment take the place of boxes G2 in FIG. 4. In such an embodiment, a time period immediately subsequent to TP61 could be assigned to devices of another group, e.g. a time period TS 2, 4, 6 . . . for group G3, in accordance with FIG. 4. The time period TP61 may correspond to a first set of time slots, as outlined for various embodiments above.

In accordance with what has been outlined above, a selection rule is applied to associate either devices or the data they are to transmit to different groups. In the example of FIG. 6, only 2 different bandwidth-dependent groups are indicated. In one embodiment, this configuration may be based on a time slot assignment scheme in which devices, or frames, are only assigned to one of two different groups, e.g. a 20-40 MHz group and an 80-160 MHz group. In another embodiment, this configuration may be realized in a system which allows for more than two groups to be determined, such as three or four groups covering the various 20, 40, 80 and 160 MHz bandwidth sizes, but where, at present, only devices or frames of two groups are to be transmitted in the BSS in question. Then there is no reason to leave time in the period of TP61 for such other absent groups.

For the sake of simplicity, reference will now be made to groups of devices, while corresponding embodiments may be based on frame bandwidth size, such that a device may change group on a frame-by-frame basis. In the embodiment of FIG. 6, devices aiming to transmit at different bandwidth are placed in different groups. In the shown example, devices of a first bandwidth, such as 80 MHz, are placed in group G61. Within G61, those devices may compete for access under CSMA/CA. Devices of a second, higher, bandwidth are allocated to a second group G62. The devices of group G62 are assigned time slots during a first set of time slots, representing a portion of the time period TP61, as indicated. In this embodiment, devices of group G61 are only assigned time slots during a second set of time slots, which may represent a complementary portion of the time period. Within the second time portion, devices of G62 may compete with each other for access under CSMA/CA. In this arrangement, devices of the group G62 will not compete for access with the devices of group G61 at all. Such an embodiment may be beneficial where devices (or data frames) of different bandwidth levels are both important.

Voice may e.g. be of high priority but of small bandwidth, belonging to group G61. If the second group G62 is assigned for e.g. high resolution streaming video, such packets may be characterized by high bandwidth RF configuration.

Figure 7:
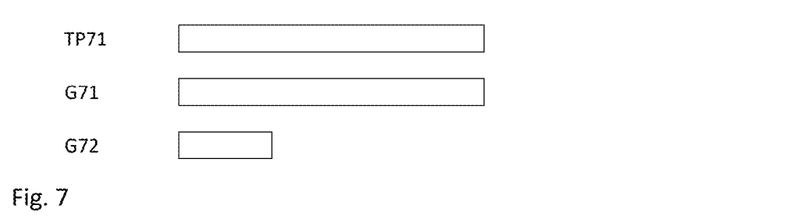
FIG. 7 illustrates an alternative way of time partitioning for different groups according to another embodiment.

FIG. 7 schematically illustrates assigning of time slots dependent on bandwidth according to another embodiment, over a time period TP71. In one embodiment, the time period TP71 may correspond to one or more time periods TS according to FIG. 4, and the slot assignment may be employed for all devices in e.g. one BSS. In such an embodiment, a subsequent time period could follow immediately upon completion of TP71, with an identical slot assignment, if the device presence and traffic pattern remains the same. In another embodiment, time period TP71 may correspond to a time period TS assigned to devices of a certain group, e.g. TS 1, 3, . . . for group G2 of FIG. 4. In such an embodiment, the time slot assigning of FIG. 7 may be employed only for devices of group G2, such as a subset of edge STAs, e.g. edge STAs of odd number BSSs. Corresponding to what was mentioned for FIG. 6, the boxes G71 and G72 in FIG. 7 would in such an embodiment take the place of boxes G2 in FIG. 4. In such an embodiment, a time period immediately subsequent to TP71 could be assigned to devices of another group, e.g. a time period TS 2, 4 . . . for group G3, in accordance with FIG. 4.

Also in the example of FIG. 7, only 2 different bandwidth levels are indicated, for the sake of simplicity, although the scheme of FIG. 7 for assigning time slots may be realized in a system which allows for more than two levels to be determined. Also in the embodiment of FIG. 7, devices with different bandwidth levels are placed in different groups. In the shown example, devices of a first bandwidth level are placed in group G71. Within G71, those STAs may compete for access under CSMA/CA, during the whole period of TP71. STAs of a second, higher, bandwidth level are allocated to a second group G72. The devices of group G72 are assigned time slots during a time period, which is different from the time period assigned to STAs of G61, as indicated, and preferably a limited first set of time slots, as compared to the larger second set of time slots assigned to group G71. Within that limited time portion, devices of G72 may compete with each other, and also with devices of G71, for access under CSMA/CA. In this arrangement, devices of the group G72 will not compete for access with the devices of group G71 for at least a part of the time period TP71, thus giving access priority to the G71 devices. The duration of the time period of access for G72, in relation to TP71 (and thus the time period of access for G71), may be set by the AP dependent on the number of devices present in the BSS, or in OBSSs, of the respective group. For example, if there are only one or few devices in the lower bandwidth group G71, the second set of time slots for group G72 may overlap to a larger extent with the first group G71, leaving a smaller time period during which the devices of G72 do not compete for access with the devices of G71, and vice versa. Preferably, this time extension assignment to the second group G72 is dynamically determined dependent on the devices present in the BSS or OBSS. Furthermore, the time period assigned to group G72 need not be aligned to commence at the same time as the time period of group G71, as indicated. On the contrary, the period for G72 may start later than the period assigned to group G71, and may also be divided into smaller periods distributed over the TP71 time period, but aggregately covering a shorter time period than the period assigned to group G72.

Returning to FIG. 1, the coordination of access to a shared transmission medium according to the embodiments given above may be carried out by an apparatus 130 in a WLAN comprising an AP 100, configured to provide radio communication with stations 110, 111, 112 in a BSS. The apparatus 130 may be included in or connected to the AP 100, or provided at another location in a network 120 in connection with the AP 100. The apparatus includes a processor 131 configured to execute program code, and a memory 132 comprising instructions that when executed by the processor 131 cause the apparatus to provide access opportunity to stations on the shared transmission medium in time slots assigned dependent on bandwidth. In various embodiments, the apparatus 130 may be distributed in a WLAN system, where both processor 131 may include a plurality of different processor units, and memory 132 may include different local or virtual memories of different kind. In addition, the methods described herein may be implemented in a computer program, software, or firmware incorporated in a computer-readable medium for execution by a computer or processor.

In one embodiment, the memory 132 of the apparatus includes instructions that when executed cause the apparatus to designate a group association dependent on bandwidth, wherein a first group is associated with transmission at a first bandwidth, and a second group is associated with transmission at a second bandwidth, which is higher than the first bandwidth, and to assign time slots for transmission of data dependent on the group association. As noted for the description of the method above, group association may be applied to allocate transmitting devices to different groups. Alternatively, the actual data to be transmitted may fall within the scope of a certain group as designated, and will therefore change group belonging on a frame-by-frame basis in such embodiments. With respect to the further aspects outlined above, the memory 132 may include instructions that when executed cause the apparatus to carry out any of the method steps describer herein, e.g. for group designation and assignment of time slots.

Figure 8:
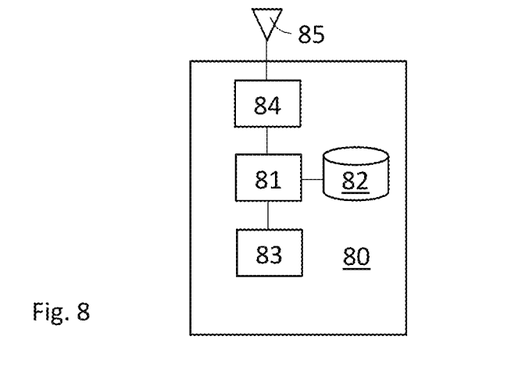
FIG. 8 schematically illustrates a device for use in a WLAN of FIG. 1, which may be configured to operate in accordance with any of the embodiments of FIGS. 3-7.

FIG. 8 schematically illustrates a device 80 for use in a WLAN configured in accordance with anyone of the embodiments outlined above. More specifically, device 80 may be configured to initiate transmission of data to a recipient device in a first basic BSS. The WLAN may be configured as described with reference to FIG. 1, including an apparatus 130 for coordinating access on to the first device on a shared transmission medium. The device 80 may comprise a processor 81, configured to execute program code, and a memory 82 comprising instructions that when executed by the processor 81 cause the device to carry out method steps according to the preceding description, and to allow operation of the device 80. As will be readily understood by the skilled reader, both the processor 81 and the memory 82 may include distributed units. A user interface 83 may be operatively connected to the processor 81, and may include both tactile elements such as keys or touch sensitive surfaces, a display, a microphone and a speaker, according to the established art. A transceiver 84 may be operatively connected to and controlled by processor 81 for carrying out WLAN radio communication. An antenna 85 may be connected to the transceiver 84 for conveying radio communication signals, including control signals and payload data, between the device 80 and e.g. an access point 100. The device 80 may e.g. correspond to any one of the stations 110, 111, 112 of FIG. 1, and may be configured to operate in a WLAN where an apparatus 130 is configured to provide access opportunity to stations, such as the device 80, on the shared transmission medium in time slots assigned dependent on bandwidth, in accordance with any one of the embodiments described herein. The device 80 is preferably configured to transmit data in accordance with a group allocation dependent on bandwidth of the data to be transmitted, and to attempt to access the shared transmission medium within time slots assigned dependent the group allocation. As outlined, group allocation may be controlled and instructed by the AP 100 or apparatus 130. The device may then be configured to determine the time slots assigned to the allocated group based on e.g. mapping carried out in the device. In a variant, information on which time slots are assigned to the group may be conveyed by the AP 100 to the device 80, which has the benefit of making it possible to update the device 80 on which time slots are assigned to a certain group, e.g. when dynamically changing the number of time slots assigned to a certain group, which may be carried out when the number of active stations of a certain group vary in the BSS. In an alternative embodiment, empty groups may be designated according to bandwidth dependent requirements, with assigned time slots for each group. Either the designation of the groups, in terms of which bandwidth relates to which group, or an identification of which time slots are assigned to the respective bandwidth groups, may be conveyed to the devices in the BSS. This information may be collected in the device 80 by means of antenna 85 and transceiver 84. The effect is that the device 80 will attempt to access the shared medium of the WLAN in time slots which are assigned dependent on the bandwidth of data transmission. In accordance with the embodiments given for the method above, time slots may be assigned dependent on a group allocation of the device 80 as such, or of data to be transmitted, e.g. on a frame-by-frame basis.

The various embodiments described have the benefit of minimizing the risk for interference, collisions or other disturbance, e.g. in OBSSs, by coordinating access to a shared transmission medium in a WLAN dependent on a bandwidth of devices of a BSS. This provides an improved control scheme for increased throughput, which is efficient and more fair than known solutions. These proposed traffic pattern based assignment can thus be used "on top of" the prior art methods, or standalone without the "edge" classification.

Although features and elements are described above in particular combinations, one of ordinary skill in the art will appreciate that each feature or element may be used alone or in any combination with the other features and elements. It should also be noted that the proposed solutions will not affect the full functioning of legacy 802.11 devices. In addition to the 802.11 protocols described herein, the features and elements described herein may be applicable to other wireless systems.

The invention claimed is:

1. A method for coordinating access to a shared transmission medium in a Wireless Local Area Network (WLAN), comprising the steps of:
designating a group association dependent on bandwidth, wherein a first group is associated with transmission at a first bandwidth, and a second group is associated with transmission at a second bandwidth, which is higher than the first bandwidth;
assigning first and second sets of time slots for transmission of data dependent on the group association;
initiating transmission of data from a first device to a second device in a first basic service set (BSS);
providing access opportunity to the first device on the shared transmission medium in one or more time slots, among the first or the second set of time slots, dependent on bandwidth of the data to be transmitted.

2. The method of claim 1, wherein the step of providing access opportunity in time slots assigned dependent on bandwidth is carried out responsive to determining that the first device is in an edge region of the first BSS with respect to a first access point (AP).

3. The method of claim 2, comprising the step of coordinating access opportunity provided to the first device with other devices associated with a second overlapping BSS.

4. The method of claim 1, comprising the step of providing access opportunity for transmission of data of the second group within the first set of time slots, but not within the second set of time slots, not including time slots of the first set of time slots.

5. The method of claim 4, comprising the step of providing access opportunity for transmission of data of the first group within the second set of time slots.

6. The method of claim 5, comprising the step of providing access opportunity for transmission of data of the first group within the first set of time slots.

7. The method of claim 1, comprising the steps of:
allocating the first device to one of said groups dependent on a selection rule;
informing the first device of the allocated group, in which access opportunity will be provided.

8. The method of claim 7, wherein said selection rule involves allocating the first device to a group that corresponds to a bandwidth capability associated with the first device.

9. The method of claim 1, comprising the step of conveying information of the designated groups to the first device, so as to allow the device to allocate to one of said groups dependent on a selection rule.

10. The method of claim 1, comprising the step of allocating the first device to one of said groups, for transmission opportunity of at least a first frame, dependent on the indicated bandwidth of said at least first frame.

11. The method of claim 10, comprising the step of allocating the first device to another one of said groups, for transmission opportunity of a later frame, dependent on the bandwidth of that said frame, if a different bandwidth is indicated for said later frame than for said first frame, corresponding to a different group association.

12. An apparatus for coordinating access to a shared transmission medium in a Wireless Local Area Network (WLAN), in which network a first device is configured to transmit data to a second device associated with a first basic service set (BSS), comprising a processor configured to execute program code, and a memory comprising instructions that when executed by the processor cause the apparatus to:
designate a group association dependent on bandwidth, wherein a first group is associated with transmission at a first bandwidth, and a second group is associated with transmission at a second bandwidth, which is higher than the first bandwidth;
assign first and second sets of time slots for transmission of data dependent on the group association; and
provide access opportunity to the first device on the shared transmission medium in one or more time slots, among the first or the second set of time slots, dependent on a bandwidth of the data to be transmitted.

13. A device configured to transmit data to a recipient device associated with a first basic service set (BSS) of a Wireless Local Area Network (WLAN),
wherein the WLAN comprises an apparatus for coordinating access to the device on a shared transmission medium, wherein the device is configured to transmit data in accordance with a group allocation dependent on bandwidth of the data to be transmitted, wherein a first group is associated with transmission at a first bandwidth, and a second group is associated with transmission at a second bandwidth, which is higher than the first bandwidth, wherein first and second sets of time slots for transmission of data are assigned dependent on the group association, and wherein the device is configured to attempt to access the shared transmission medium in one or more time slots, among the first or the second sets of time slots, which time slots are assigned dependent on bandwidth of the data to be transmitted.

* * * * *